(12) United States Patent
Hirth et al.

(10) Patent No.: US 6,340,171 B1
(45) Date of Patent: Jan. 22, 2002

(54) AIR BAG MODULE IN A MOTOR VEHICLE

(75) Inventors: Andreas Hirth, Diehlheim; Ulrich Tschaeschke, Ehningen, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/156,356

(22) Filed: Sep. 18, 1998

(30) Foreign Application Priority Data

Oct. 29, 1997 (DE) ............................... 197 47 730
Aug. 27, 1998 (DE) ............................... 198 38 641

(51) Int. Cl.[7] ............................... B60R 21/22
(52) U.S. Cl. ............... 280/730.2; 280/748; 280/751
(58) Field of Search ............... 280/730.2, 728.2, 280/732, 748, 751, 730.1

(56) References Cited

U.S. PATENT DOCUMENTS

| | | | | |
|---|---|---|---|---|
| 4,828,287 A | * | 5/1989 | Siler | 280/751 |
| 5,382,051 A | * | 1/1995 | Glance | |
| 5,503,427 A | * | 4/1996 | Ravenberg et al. | 280/732 X |
| 5,628,527 A | * | 5/1997 | Olsen et al. | 280/730.2 |
| 5,636,866 A | * | 6/1997 | Suzuki et al. | 280/748 |
| 5,649,721 A | * | 7/1997 | Stafford et al. | |
| 5,725,271 A | * | 3/1998 | Patel et al. | |
| 5,791,683 A | * | 8/1998 | Shibata et al. | 280/730.2 |
| 5,836,641 A | * | 11/1998 | Sugamoto et al. | 280/751 X |
| 5,988,673 A | * | 11/1999 | Stavermann | 280/730.1 |
| 5,992,914 A | * | 11/1999 | Gotah et al. | 280/751 X |
| 5,992,924 A | * | 11/1999 | Noritake et al. | 280/751 X |
| 6,036,227 A | * | 3/2000 | Lin et al. | 280/751 |
| 6,079,732 A | * | 6/2000 | Nakajima et al. | 280/728.2 |
| 6,170,861 B1 | * | 1/2001 | Tietze | 280/730.2 |

FOREIGN PATENT DOCUMENTS

| | | |
|---|---|---|
| DE | 2 249 988 | 4/1974 |
| DE | 92 11 423.7 | 12/1992 |
| DE | 44 26 848 | 2/1996 |
| DE | 296 03 316 | 8/1996 |
| DE | 296 05 896 | 9/1996 |
| DE | 19612227 | * 10/1997 |
| DE | 196 12 227 | 10/1997 |
| DE | 297 16 793 | 3/1998 |
| EP | 0 666 203 | 8/1995 |
| EP | 0 734 917 | 10/1996 |
| EP | 0 773 142 | 5/1997 |
| EP | 0 841 221 | 5/1998 |
| GB | 2 297 950 | 8/1996 |
| JP | 10138861 | 5/1998 |
| WO | 94/19215 | * 9/1994 |

* cited by examiner

Primary Examiner—Brian L. Johnson
Assistant Examiner—Bryan Fischmann
(74) Attorney, Agent, or Firm—Crowell & Morig LLP

(57) ABSTRACT

An air bag module in a motor vehicle includes an elongate container, which can be fixed along a frame part of the vehicle and in which an air bag is folded which, after a crash signal, is filled with gas, emerges from the container and covers vehicle parts in the passenger space two-dimensionally. Additionally, an element, absorbing energy due to its deformation upon impact with a passenger, is mounted in or at the container along the frame part of the vehicle.

19 Claims, 2 Drawing Sheets

AIR BAG MODULE IN A MOTOR VEHICLE

This application claims the priority of German patent document 198 38 641.9 filed Oct. 29, 1997, and German patent document 197 47 730.5-21 filed Aug. 27, 1998, the disclosures of which are expressly incorporated by reference herein.

BACKGROUND AND SUMMARY OF THE INVENTION

The invention relates to an air bag module in a motor vehicle, and more particularly, to a window air bag module which is mounted along a roof frame of the vehicle to protect a vehicle occupant's head from impact with the roof frame or an adjacent window.

German patent document DE 44 26 848 A1 discloses a window bag, which is accommodated in a folded state in a container, which is held along a door frame part in the passenger space by means of a clamping device at the frame part. The combination of the lateral window bag with the gas generator in a container, which can be fixed, into an air bag module permits a simple and cost-effective installation. German patent document DE 22 49 988 A1 discloses an air bag, which can be filled with a gas and is disposed in the head region of a passenger in a container laterally at the roof frame and, together with the latter, forms a part of the roof frame lining.

German patent document DE 92 11 423 U1 also discloses an air bag, which can be filled with a gas and, folded together in a container, is fixed to frame sections of the side window.

German patent document DE 296 05 896 U1 discloses a device which protects passengers against a side impact and includes a head air bag which, folded together, extends in an installing tube along a roof frame.

German patent document DE 296 03 316 U1 relates to a device for protecting passengers against a side impact, with a window bag, which is held with the filling gas generator at an adapter plate, which serves to fix the module to a roof frame. The module is covered by a roof-lining plate.

Moreover, Great Britain patent document GB 2 297 950 A shows a window bag, which is stowed in a duct in the door frame of a motor vehicle, from which the window bag emerges in the event of a collision and spreads out over the side window.

With these known air bag arrangements, the protective action in the event of an impact commences only after the activation of the air bag, i.e., a vehicle occupant is protected from impact with the vehicle frame or the air bag housing only after the air bag is inflated.

Moreover, publications are known from the state of the art, in which air bags are described which are not constructed as window bags along a roof frame of a vehicle. Energy-absorbing elements are assigned to these air bags but cannot protect the passengers in the event of a collision next to a folded-together window bag which has not yet been activated, from a high impact with the side wall lying further back relative to the window bag or with the roof frame of the vehicle.

In European patent document EP 07 73 142 A1, a vehicle air bag is described, which has, within the air bag, a pot-shaped, energy-absorbing element, which is deformed upon a collision with the passenger, in which the air bag is not yet filled. The pot-shaped, energy-absorbing element has passages for the gas from the gas generator. In the event of a prior deformation, the cleared cross section of these passages could be changed and, with that, hinder uniform filling of the gas bag. After the deformation of the energy-absorbing element, the air bag will also no longer lie in the intended position, for a favorable unfolding. A protective function would not be achieved by this pot-shaped element next to the folded air bag.

European patent document EP 0 734 917 A1 discloses an air bag cover, which is equipped with a yielding sandwich construction for damping a collision of the head with the air bag cover. The cover lies over the folded air bag at a great distance from the car body structure and therefore has no damping effect on the passenger impacting to the side of the folded air bag.

In European patent document EP 06 66 203, an air bag container is described, the opening edge of which, directed towards the passengers, is lined with protective elements, in order to avoid a hard impact of the passengers with this edge. These protective elements are also far removed from a hard car body structure and can therefore also not prevent a hard impact with this structure.

It is an object of the invention to improve the protective action of an air bag module for a passenger, and particularly a window air bag mounted along the roof frame.

This and other objects have been achieved according to the present invention by providing an air bag module in a motor vehicle, comprising an elongate container which can be fixed along a roof frame of the vehicle and in which a window bag is folded which, after a crash signal, is filled with gas, emerges from the container and covers vehicle parts in a passenger space, wherein an energy-absorbing element is mounted in or at the container along the roof frame of the vehicle, said energy-absorbing element being deformable upon impact by a passenger to a side of the folded window bag.

This and other objects have also been achieved according to the present invention by providing an air bag module in a motor vehicle, comprising: a container mounted along a roof frame of the motor vehicle; an air bag arranged within said container; and a deformable energy-absorbing element mounted in or adjacent said container.

An additional energy-absorbing element, mounted in or at the container for the window bag and integrated in the air bag module, permits the safety device for impact with the passenger to be installed easily and cost-effectively. Thus, the passenger is protected against injuries not only at the time when the window bag expands from the container in front of the hard side impact parts in the vehicle after a crash signal by being filled with gas (for example, from a gas generator), but also when the window bag is not filled. In the event of a collision, which does not yet cause the window bags to be filled, the passenger collides with the energy-absorbing element, which is disposed additionally next to the folded window bag, yields by being deformed and, at the same time absorbs energy and protects the passenger against a hard collision with the side wall lying further back relative to the window bag or with the roof frame of the vehicle. The element, extending along the vehicle roof frame as a deformable pipe or as a foamed object and constructed to absorb energy as it is being deformed, can be fixed at the side of the air bag in the direction in which the air bag unfolds. Thus, the air bag module is not wide towards the passenger space. For this reason, the energy-absorbing element advantageously is mounted to a container that is fixed to the roof frame of a vehicle and in which a window bag is positioned. Thus, the element can effectively dampen a head impact of the passenger when the force of the impact is below the threshold for releasing the window bag.

DETAILED DESCRIPTION OF THE DRAWINGS

Figure 1:
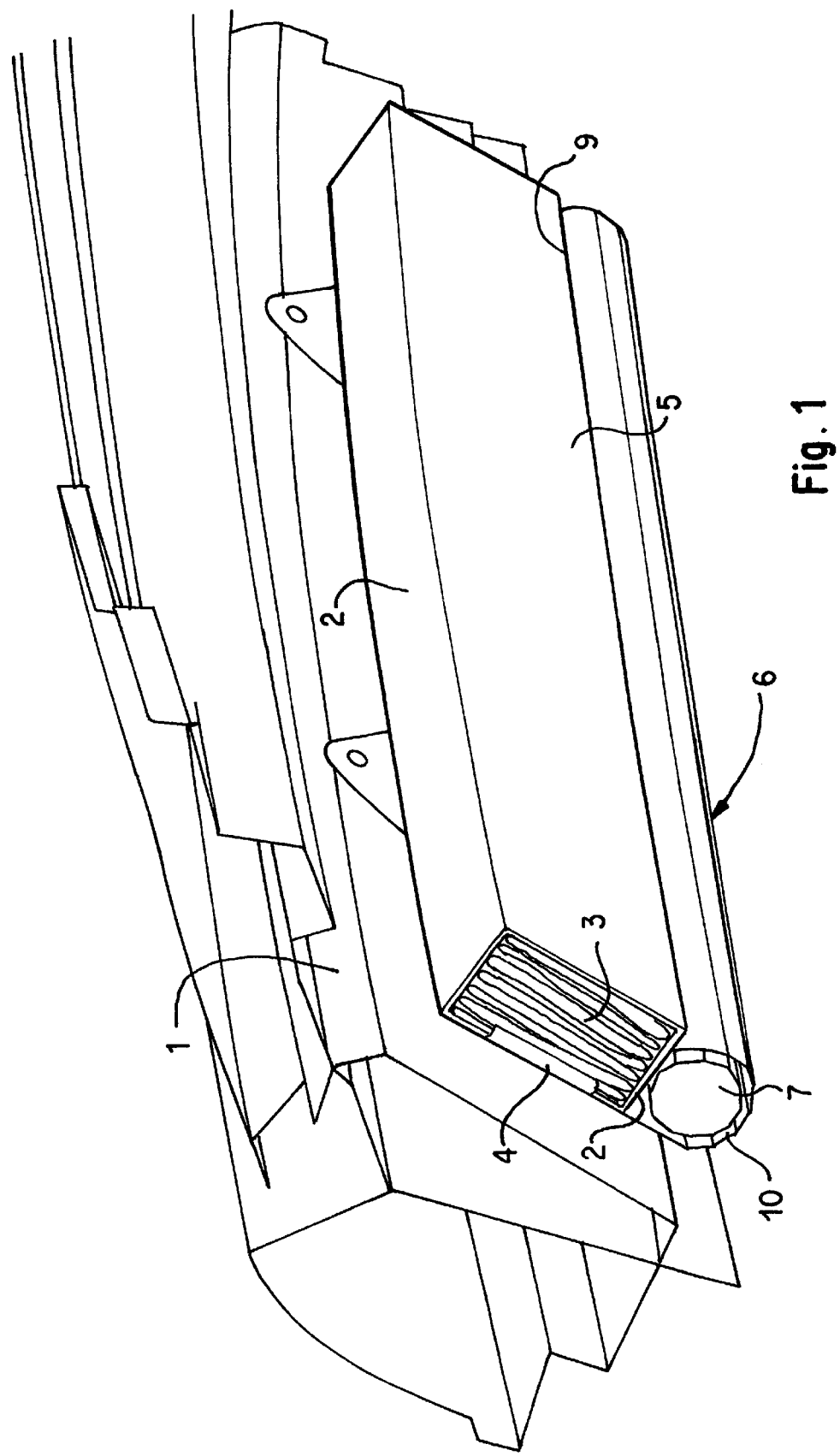
FIG. 1 shows a perspective view of an air bag module with an energy absorbing element according to a preferred embodiment of the present invention.

FIG. 1 shows a plastic container 2, which is fastened in the interior of a motor vehicle at a roof frame 1, extends along the roof frame in the longitudinal direction of the vehicle and accommodates a folded together window bag 3 in a cavity. In the event of a collision of the motor vehicle, for which the measured impact values, sensed during the impact, exceed the release threshold for the window bag 3, the window bag 3 is filled with gas from a gas generator 4, forces open the front side 5 of the container 2 as if it were a flap (for example via a film-type hinge or weakened area 9 of the container 2) and expands downward over the side windows of the motor vehicle, which are not shown in detail, in the form of a protective curtain, as a result of which the impact of a passenger with the side windows is dampened and injuries are reduced.

In addition, the air bag module 6 includes an energy absorbing element 7, 8 located to the side of (i.e., below) the container 2 containing the folded window bag 3. In the embodiment of FIG. 1, the energy absorbing element 7 is contained in a retaining pocket 10, which may be made in one piece with the container 2, for example by injection molding or extruding a synthetic material. Alternatively, the retaining pocket 10 may be made separately and then fastened to the container, for example via rivets, threaded connectors, or adhesives. The retaining pocket 10 may have a different thickness than the container 2, as shown in FIG. 1, or it may have the same thickness, depending for example on the rigidity or other characteristics of the sythetic material from which it is formed. It is also contemplated that the energy absorbing element 7 be directly attached to the bottom side of the plastic container 2 (i.e., eliminating the retaining pocket 10), for example via rivets, threaded connectors, or adhesives.

Figure 2:
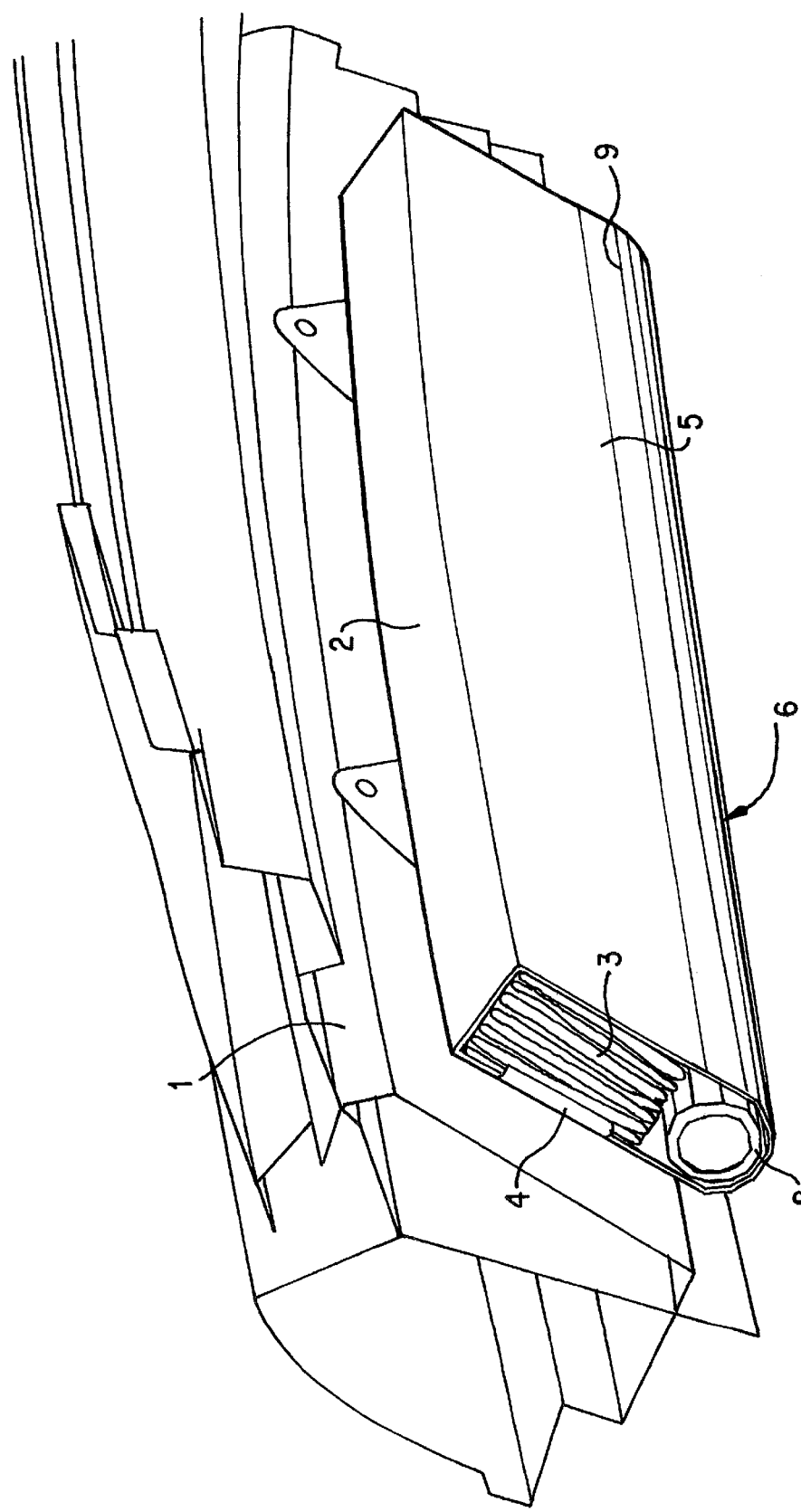
FIG. 2 shows a perspective view of an air bag module with an energy absorbing element according to another preferred embodiment of the present invention.

In the embodiment of FIG. 2, the energy absorbing element 8 is contained within the container 2, which also contains the folded window bag 3. As in the embodiment of FIG. 1, the container 2 may be made by injection molding or extruding a synthetic material. The energy absorbing element 8 may be attached to the container 2, for example via rivets, threaded connectors, or adhesives, to prevent it from falling out of the container during deployment of the window bag 3.

The energy absorbing element may have a solid cross-section 7 (i.e., bar-like), as shown in FIG. 1, or may have a hollow cross-section 8 (i.e., pipe-like), as shown in FIG. 2. The function of the energy absorbing element 7, 8 is to cushion the passenger (e.g., the passenger's head) during a collision in a yielding manner to avoid direct impact with the roof frame or the air bag housing itself, particularly prior to deployment of the window bag 3. Energy is absorbed especially during the plastic deformation of the element 7, 8, as a result of which the passenger is subjected to lesser stresses during the collision. The energy-absorbing element 7, 8 may be made of plastic or aluminum, with a cross-sectional profile which is adapted to the possible load. The energy-absorbing element may be provided with transverse ribs, or also have a different suitable deformation profile or also be formed by a foam suitable for damping the collision. The energy absorbing element extends, together with the transverse extent of the window bag 3, in a protective manner along the roof frame 1 of the vehicle and can protect the passenger against a hard impact with the side wall, lying further back relative to the window bag, or with the roof frame 1 of the vehicle.

The arrangement of the energy-absorbing element 7, 8 to the side of the folded window bag 3, that is, below the window bag 3 here, has the advantage that the degree of comfort in the interior for the head is not diminished by the energy-absorbing element 7, 8 and that therefore more freedom for movement of the head remains within the passenger space.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An air bag module in a motor vehicle, comprising:
    an elongate container fixed along a roof frame of the vehicle;
    a window bag folded in the container which, after a crash signal, is filled with gas, and emerges from the container; and
    an energy-absorbing element mounted in or on the container along the roof frame of the vehicle, said energy-absorbing element being deformable upon impact by a passenger.

2. An air bag module according to claim 1, wherein said crash signal is generated upon an impact of a threshold at which the window bag is filled with gas, said energy-absorbing element being effective to protect said passenger below said threshold.

3. An air bag module according to claim 1, wherein said energy-absorbing element is arranged to a side of an unfolding direction of said window bag.

4. An air bag module according to claim 1, wherein said energy-absorbing element is formed as a pipe, extending longitudinally at the roof frame.

5. An air bag module according to claim 1, wherein said energy-absorbing element is formed as a foamed body.

6. An air bag module according to claim 1, wherein said energy-absorbing element is disposed in said container.

7. An air bag module according to claim 1, wherein said energy-absorbing element is disposed adjacent said container in a retaining pocket.

8. An air bag module according to claim 7, wherein said retaining pocket is formed in one piece with said container.

9. An air bag module according to claim 7, wherein said retaining pocket is formed separately from said container, said retaining pocket being attached to said container.

10. An air bag module in a motor vehicle, comprising:
    a container mounted along a roof frame of the motor vehicle;
    an air bag arranged within said container, wherein said air bag emerges from said container upon being filled with gas; and a deformable energy-absorbing element mounted in or on said container.

11. An air bag module according to claim 10, wherein said energy-absorbing element is arranged below said air bag.

12. An air bag module according to claim 10, wherein said energy-absorbing element is formed as a pipe, extending longitudinally at the roof frame.

13. An air bag module according to claim 10, wherein said energy-absorbing element is formed as a foamed body.

14. An air bag module according to claim 10, wherein said energy-absorbing element is disposed in said container.

15. An air bag module according to claim 10, wherein said energy-absorbing element is disposed adjacent said container in a retaining pocket.

16. An air bag module according to claim 15, wherein said retaining pocket is formed in one piece with said container.

17. An air bag module according to claim 15, wherein said retaining pocket is formed separately from said container, said retaining pocket being attached to said container.

18. An air bag module in a motor vehicle, comprising:

an elongated container fixed along a roof frame of the vehicle;

a window air bag folded in the container which, above a release threshold, is filled with gas and emerges from the container; and an energy-absorbing element mounted in or affixed to the container, said energy-absorbing element being deformable upon impact by a passenger and being effective to protect said passenger below said release threshold.

19. A method for protecting a passenger of a vehicle with an air bag module, comprising:

below a release threshold, protecting said passenger via an energy-absorbing element mounted in or affixed to an elongated container; and above a release threshold, filling a folded window air bag in the elongated contained with gas, wherein the window air bag emerges from the elongated contained and protects said passenger, wherein said air bag module comprises the elongated container fixed along a roof frame of the vehicle and containing the folded window air bag.

* * * * *